May 3, 1949. S. T. FARRELL ET AL 2,469,297
PULLEY
Original Filed March 24, 1944
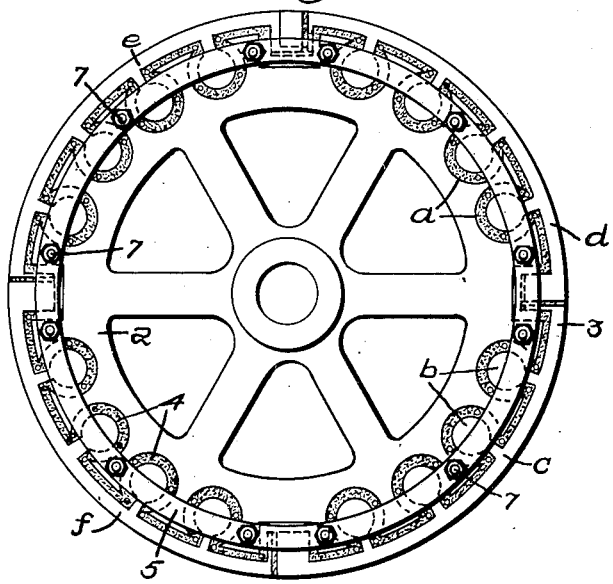
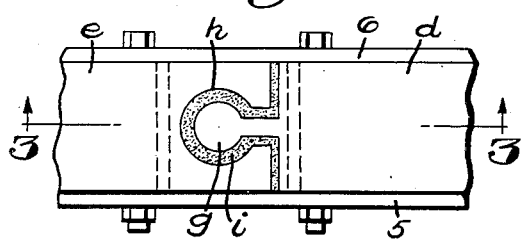
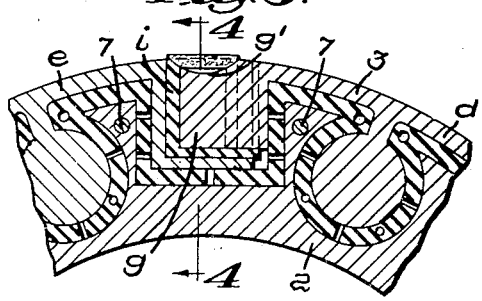
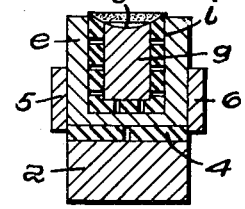
Inventors:
Sydney T. Farrell and
Frederick L. Farrell,
by J. H. McCrady,
Attorney.

Patented May 3, 1949

2,469,297

UNITED STATES PATENT OFFICE 2,469,297

PULLEY

Sydney T. Farrell and Frederick L. Farrell,
Belmont, Mass.

Original application March 24, 1944, Serial No. 527,867. Divided and this application July 24, 1946, Serial No. 685,819

5 Claims. (Cl. 74—230.5)

This invention relates to belt drives, and it aims to improve the pulleys used in mechanisms of this type with a view both to reducing the liability of braking a belt when heavy increases in load are suddenly applied to it, as for example, when a clutch is let in too quickly, and also to minimize the strain imposed on the machinery driven by the pulley under such circumstances.

The nature of the invention will be readily understood from the following description when read in connection with the accompanying drawings, and the novel features will be particularly pointed out in the appended claims.

In the drawings,

Fig. 1 is a side elevation of a pulley embodying this invention;

Fig. 2 is a plan view of a small section of the periphery of the pulley shown in Fig. 1; and Figs. 3 and 4 are sectional views taken, respectively, on the lines 3—3, Fig. 2, and 4—4, Fig. 3.

The pulley structure shown in the drawings comprises a central or hub section 2 and a separate rim section indicated, in general at 3, the latter encircling the hub section. This hub section is provided with a series of recesses or grooves $a$, each having an approximately cylindrical cross-sectional form, which open into the peripheral surface of the hub section, the axes of these grooves or recesses lying parallel to the axis of the pulley. The rim 3 is provided with integral lugs or ribs $b$ which are positioned in the respective grooves $a$ and are of essentially the same cross-sectional form as the latter, but they are sufficiently smaller in diameter than the recesses to provide between them the space necessary to accommodate a molded layer of cushioning material 4. As clearly shown in Figs. 1 and 3, the ribs have approximately semicircular sides and the grooves are of complemental shape to receive them. Thus the maximum width circumferentially of each rib is at an intermediate point in its radial length, and this is also true of each groove.

Preferably the rim is made in a plurality of sections, the number of which is selected in accordance with the dimensions of the pulley and the requirements of the service to which it is to be put. In the particular construction shown there are four of these sections, indicated in Fig. 1 at $c$, $d$, $e$ and $f$. Usually it will be found most convenient to make the cushioning material 4 in corresponding sections. The parts are assembled by first securing the rim sections together to complete this member, and then sliding it and the cushioning material 4 edgewise on to the hub, with the bosses $b$ entering the grooves $a$ of the hub section 2, the assembling movement being in a direction generally parallel to the axis of the pulley.

Preferably the ends of adjoining sections of the rim are interlocked with each other, as best shown in Figs. 2 and 3. As there illustrated, the section $d$ has an extension $g$ of the same general form as one of the elements $b$, and it extends into a socket $h$ similar to the recesses $a$ formed in the section $e$. The walls of these two parts $g$ and $h$ are isolated, one from the other, by an intervening cushioning member $i$. The same construction is provided at each of the joints, so that while this rim is interlocked with the hub section through the medium of the cushioning material 4, the rim sections themselves are interlocked with each other, through the cushioning layer $i$, against separation circumferentially.

In order to prevent any movement of the three parts 2, 3 and 4 axially, one relatively to the other, two retaining plates, indicated at 5 and 6, respectively, are secured to the hub member 3 by bolts 7 where they overlie lateral surfaces of both the members 2 and 3 and also the lateral edges of the cushioning material 4.

The sections of cushioning material 4 and $i$ may be made of rubber, either natural or synthetic, or of other plastic compositions having resilient properties, and they may be compounded by methods well known in the plastic art to give them the desired degree of hardness and elasticity. For this purpose they may be reinforced, when necessary, by fillers of a granular, pulverulent, or fibrous character. Or, they may consist of fabric impregnated, coated, or laminated with elastic compositions so as to give them the necessary degree of toughness and stability for mechanical purposes, while still having the desired cushioning properties. Also, these parts may be perforated or manufactured by any desired method to give them sufficient porosity for cushioning purposes. Whether or not such porosity is necessary will depend upon the nature of the composition and the degree of cushioning effect required. If these cushioning members are made of rubber, which is substantially non-porous, then they should be provided with cut-outs or holes, as best shown in Figs. 3 and 4, or made in some manner such that the rubber can flow under compression. While some lateral flow is provided by the fact that the edges of the rubber inserts 4 are confined at only relatively narrow areas, where they bear against the retaining plates 5 and 6, the degree of flow so provided may not be sufficient to give the desired results, in some instances, and perforations, or some equivalent constructions, such as those indicated at 3 and 4, then become desirable because of the fact that solid rubber is substantially non-compressible.

It will be evident from the foregoing that whether the pulley drives the belt, or is driven by it, any sudden starting or stopping movement of it will be cushioned by the resilient members $i$ and 4, and that they will, consequently, materially reduce the strain that otherwise would be placed both on the belt and also on the machinery driven by the pulley, in the event that it operates as a driven pulley.

Under such conditions as those just described, it is important that the tractive effort transmitted through the cushioning material from the ribs of the rim sections to the walls of the recesses in the hub, or vice-versa, shall not produce any substantial camming action tending to force the rim sections outwardly. Any tendency of this nature is substantially eliminated in the construction shown by the fact that the ribs $b$ and the sockets $a$, in which the ribs are located, are so shaped that ample portions of their surfaces through which the tractive effort is transmitted are positioned at approximately right angles to the line of traction, this line being the circumference passing substantially through the centers of the sockets and the ribs. While the complemental faces of these intermeshing parts do include inclined portions, some of which are located at the inner side of the line of traction, and others at the outer side of said line, the symmetrical nature of these ribs and grooves is such that any camming action created at the inner side of said line is substantially counter-balanced by the approximately equal and outer forces simultaneously created at the outer side of said line. In other words, any component so created in a direction tending to force the rim 3 outwardly is substantially balanced by an oppositely directed component of the same force so that no dominating component of any substantial value is created either inwardly or outwardly. If desired, also, each of the extensions $g$ and the portions of the cushioning material $i$ substantially surrounding them, may be shaped to form a suction cup $g'$ which, when covered by the belt, will have a tendency to increase the grip of the belt on the pulley.

While we have herein shown and described a typical embodiment of our invention, it will be evident that the invention may be embodied in other forms without departing from the spirit or scope thereof.

This application is a division of our copending application Serial No. 527,867, filed March 24, 1944.

Having thus described our invention, what we desire to claim as new is:

1. A pulley comprising a hub, a rim encircling said hub, one of said members being provided with ribs and the other with grooves in which said ribs are located, both the ribs and the grooves being in the line of the traction force transmitted from one of said members to the other, and cushioning means interposed between said rim and hub and substantially isolating them from each other, said cushioning means including parts located in said grooves and spacing said ribs from the walls of said grooves, the ribs being of greater width in a circumferential direction at intermediate points in their radial length than at other points in said length, and the grooves being of complemental form to receive said ribs, said points of maximum width of both the ribs and the grooves being positioned substantially in said line of traction as to avoid producing any dominant component of the traction force in a direction radially of the pulley, said cushioning means being free to expand and contract sufficiently to cushion the transmission of shock from said hub to the rim, or vice-versa.

2. A pulley according to preceding claim 1, in which said rim is divided into circumferential sections, the ends of which are interlocked with each other through one or more cushioning elements.

3. A pulley according to preceding claim 1, in which said rim is divided into circumferential sections, and said cushioning means is divided into sections corresponding to said rim sections and associated, respectively, with the latter.

4. A pulley according to preceding claim 1, including retaining plates secured to the opposite sides of one of said pulley members and overlapping end portions of said cushioning member at the lateral surfaces of the pulley.

5. A pulley according to preceding claim 1, in which each of said ribs has opposite sides of approximately semi-cylindrical form.

SYDNEY T. FARRELL.
FREDERICK L. FARRELL.

REFERENCES CITED

The following references are of record in the file of this patent:

UNITED STATES PATENTS

| Number | Name | Date |
| --- | --- | --- |
| 1,460,869 | Thropp | July 3, 1923 |
| 1,946,956 | Waseige | Feb. 13, 1934 |